United States Patent
Williams et al.

(10) Patent No.: US 9,542,170 B2
(45) Date of Patent: *Jan. 10, 2017

(54) DEVELOPMENT TOOL FOR FOOTPRINT REDUCTION

(75) Inventors: Clark Williams, Madison, AL (US); Brendan Conoboy, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 161 days.

This patent is subject to a terminal disclaimer.

(21) Appl. No.: 13/272,186

(22) Filed: Oct. 12, 2011

(65) Prior Publication Data

US 2012/0030662 A1 Feb. 2, 2012

Related U.S. Application Data

(63) Continuation of application No. 11/607,239, filed on Nov. 30, 2006, now Pat. No. 8,051,413.

(51) Int. Cl.
*G06F 9/45* (2006.01)
*G06F 9/445* (2006.01)

(52) U.S. Cl.
CPC ............ *G06F 8/4435* (2013.01); *G06F 8/62* (2013.01)

(58) Field of Classification Search
CPC ................................ G06F 8/62; G06F 8/4435
See application file for complete search history.

(56) References Cited

U.S. PATENT DOCUMENTS

| | | | |
|---|---|---|---|
| 6,708,330 B1 * | 3/2004 | Moberg et al. | 717/158 |
| 6,718,543 B2 * | 4/2004 | Arai et al. | 717/158 |
| 7,207,038 B2 | 4/2007 | Bicsak et al. | |
| 7,640,539 B2 * | 12/2009 | Alexander et al. | 717/130 |
| 2005/0050521 A1 * | 3/2005 | Chang | 717/124 |
| 2006/0149732 A1 * | 7/2006 | Huang et al. | 707/6 |
| 2006/0161898 A1 * | 7/2006 | Bauman et al. | 717/127 |
| 2006/0174099 A1 | 8/2006 | Wang | |
| 2006/0190933 A1 | 8/2006 | Tzeng | |
| 2006/0190939 A1 | 8/2006 | Chen | |
| 2008/0016410 A1 | 1/2008 | Pu | |

OTHER PUBLICATIONS

Msdn, "Remove Unnecessary Devices to Optimize Footprint," Windows XP Embedded, available http://msdn.microsoft.com/en-us/library/bb521524(v=winembedded.51).aspx, 2 pages, 2011.
Msdn, "How to Take Advantage of Footprint Reduction in Windows XP Embedded Service Pack 2 Feature Pack 2001," Windows XP Embedded, Available http://msdn.microsoft.com/en-us/library/bb147519(v=winembedded.5).aspx, 34 pages, Aug. 22, 2004.

* cited by examiner

*Primary Examiner* — Lewis A Bullock, Jr.
*Assistant Examiner* — Jacob Dascomb
(74) *Attorney, Agent, or Firm* — Lowenstein Sandler LLP

(57) ABSTRACT

A method and apparatus for reducing a memory footprint of an embedded system. The method may include analyzing packages installed in a root file system of the embedded system, and determining which package components are not required for the operation of the embedded system. The method further includes reducing a memory footprint of the embedded system based on the above determination.

16 Claims, 6 Drawing Sheets

DEVELOPMENT TOOL FOR FOOTPRINT REDUCTION

RELATED APPLICATION

This application is a continuation of U.S. patent application Ser. No. 11/607,239, filed Nov. 30, 2006 now U.S. Pat. No. 8,051,413, and assigned to the assignee of the present application and is hereby incorporated by reference.

TECHNICAL FIELD

Embodiments of the present invention relate to embedded systems, and more specifically to reducing the footprint of an embedded system.

BACKGROUND

An embedded system is a special-purpose system in which the computer is encapsulated by the device it controls. Devices that utilize embedded systems may include, for example, information appliances, smart phones, set-top boxes, personal digital assistants (PDAs), etc.

Embedded systems often utilize the Linux operating system because it is available as open source software. Linux was initially designed for use with enterprise computer systems that have a large amount of storage space available. Embedded systems, in contrast, have a limited amount of storage space. In addition, an embedded system, unlike a general-purpose computer such as a personal computer, usually performs a single predefined function having very specific requirements. Hence, in view of space constraints and cost savings, an embedded system should provide only the storage space that is required for the specified function.

When developing an embedded system, a designer typically uses a development environment on a host PC. In particular, the developer selects a set of software packages for the embedded system and copies these software packages to the host PC. The software packages may be in the RPM (Red Hat® Package Manager) format, which is a native packaging format of the Linux operating system. The software packages are integrated into a root file system, which is then compressed to an image file and loaded to a target device. Since the target device is limited in storage volume, the developer may need to remove the unnecessary packages from the root file system in an effort to decrease the usage volume of the memory. This removal is a manual process, which is inefficient and prone to mistakes.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
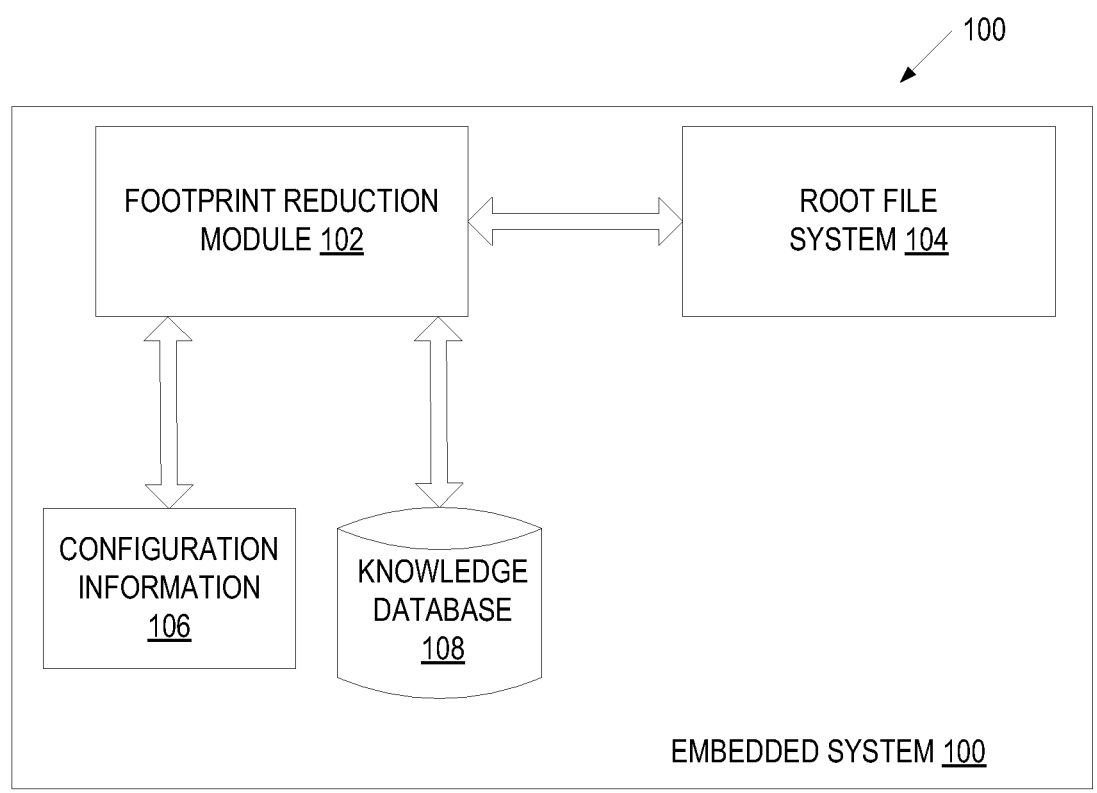
FIG. 1 is a block diagram of one embodiment of an embedded system.

Described herein is a method and apparatus for reducing a memory footprint of an embedded system. An embedded system includes a root file system or directory that has various software packages. In one embodiment, the packages of the root file system are automatically analyzed to determine which package component are not required for the operation of the embedded system. The package components that are not required are then automatically removed from the root file system to reduce the memory footprint of the embedded system.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of one embodiment of an embedded system 100. The embedded system 100 may be part of an information appliance, a smart phone, a set-top box, a personal digital assistant (PDA), etc. The embedded system 100 may run an operating system such as Linux, Windows, Solaris, OS-X, IRIX, HP-UX, etc. Based on its type, the embedded system 100 performs a specific function or a few specific functions.

The embedded system 100 includes a root file system 104 having multiple software packages that may be in a native package format of the operating system. Examples of package formats include Red Hat® Package Manager (RPM) format, Itsy Package Management System (IPKG) format, Debian Package (DEB) format, Windows Installer (MSI) package format, Solaris datastream package (PKG) format, etc. Alternatively, packages may be in an arbitrary format not related to the operating system. For example, the Solaris datastream package may be used with Linux files, etc. In addition, packages can be converted from one format to another during the development of the embedded system (e.g., RPM packages may be converted into the IPKG format and vice versa). Software packages may include source code, executable files, support files and shared libraries that may be used by the operating system and applications running on the embedded system 100. In addition, packages may include programs to execute (a program may be executed when a packages is installed or uninstalled). The number, type and contents of software packages differ between software package formats. For example, the RPM or IPKG packages used on Linux may include packages with manual pages to allow user interaction with the operation of the system, packages with locale information for different languages to be used during the operation of the system, packages for different device drivers, etc.

The embedded system 100 may also store configuration information 106 that includes configuration parameters provided by a user or set by a manufacturer. The configuration information 106 may specify the language to be used by the user of the embedded system 100, the type of the embedded system 100 (e.g., a set-top box, a hand-held device, etc.), the functions to be performed by the embedded system 100 (e.g., email access, phone functionality, etc.), etc.

In one embodiment, the embedded system 100 hosts a footprint reduction module 102 that analyzes the packages of the root file system 104 to determine which of package components are not required for the operation of the embedded system 100. The footprint reduction module 102 may determine which package components are not required based on the configuration information 106. The package components that can be analyzed in view of the configuration information 106 may include components of source code packages, executable file packages and support file packages. For example, the language configuration parameter may be used to determine which locales are not needed for the operation of the embedded system 100. In another example, the configuration parameter specifying the type of the embedded system may be used to determine whether manual pages are required for the embedded system 100. In yet another example, the configuration parameter specifying the functions to be performed by the embedded system may be used to determine which device drivers are not needed for the operation of the embedded system 100.

In one embodiment, the footprint reduction module 102 also performs shared library dependency analysis on shared libraries to determine which shared libraries are not required for the operation of the embedded system 100. The footprint reduction module 102 may decide that a shared library is not required if the shared library is not referenced by any executable file on the root file system 104.

When the footprint reduction module 102 identifies the package components that are not required for the operation of the embedded system 100, the footprint reduction module 102 removes the identified package components from the root file system 104, thus reducing the memory footprint of the embedded system 100. In one embodiment, prior to removing the identified package components from the root file system 104, the footprint reduction module 102 consults a knowledge database 108 to verify that the removal of these package components will not result in abnormal operation of the embedded system 100. The knowledge database 108 may identify package components that always have to be present in the root file system 104 in order for the embedded system 100 to operate properly. The knowledge database 108 may reside on the embedded system 100 or be accessible to the embedded system via a network (e.g., public network or private network).

In one embodiment, the footprint reduction module 102 operates without any user interaction, thus providing an efficient and error-free mechanism for reducing the memory footprint of the embedded system 100.

Figure 2:
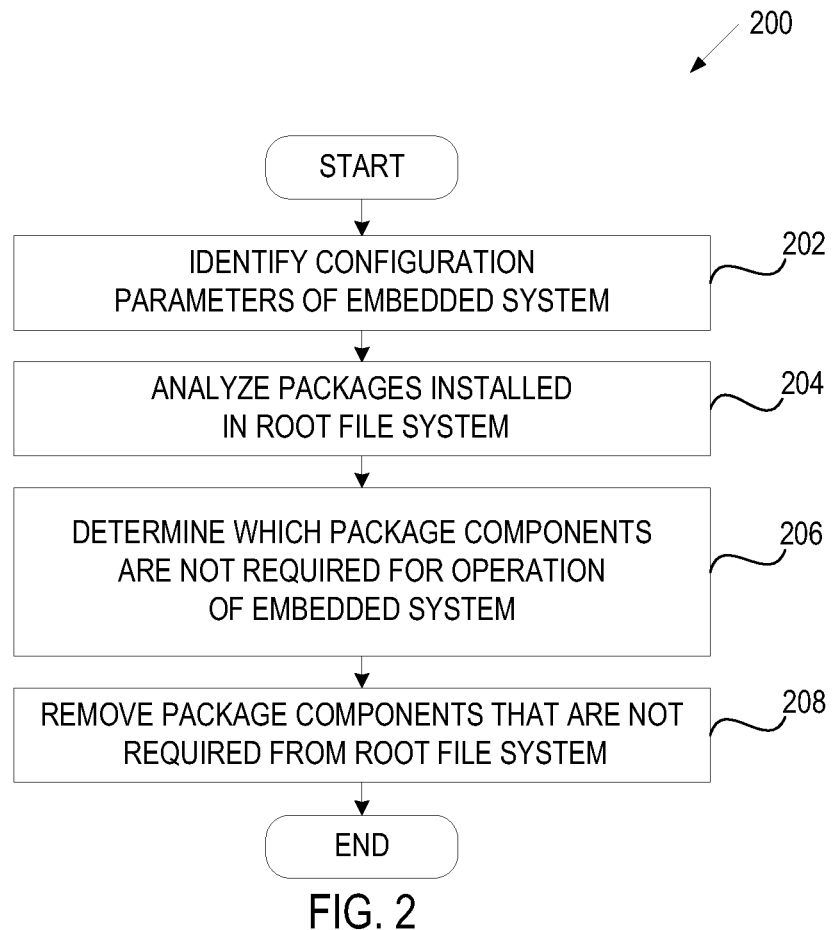
FIG. 2 is a flow diagram of one embodiment of a method for reducing a memory footprint of an embedded system.

FIG. 2 is a flow diagram of one embodiment of a method 200 for reducing a memory footprint of an embedded system. The method may be performed by processing logic that may comprise hardware (e.g., circuitry, dedicated logic, programmable logic, microcode, etc.), software (such as instructions run on a processing device), or a combination thereof. In one embodiment, method 200 is performed by a footprint reduction module 102 of FIG. 1.

Referring to FIG. 2, method 200 begins with processing logic identifying configuration parameters of an embedded system (block 202). The configuration parameters may be specified by a user or set by a manufacturer. The configuration parameters may include, for example, a parameter specifying the language to be used by the user of the embedded system, a parameter specifying the type of the embedded system (e.g., a set-top box, a smart phone, a PDA, etc.), a parameter specifying the functions to be performed by the embedded system, etc.

At block 204, processing logic analyzes packages installed on the root file system of the embedded system. The packages may be in a native packaging format of the operating system. For example, the packages installed on the root file system of Linux may be in the RPM format, the packages installed on the root file system of Solaris may be in the Solaris datastream package format, etc. Alternatively, packages may be in an arbitrary format not related to the operating system. For example, the Solaris datastream package may be used with Linux files, etc. In addition, packages can be converted from one format to another during the development of the embedded system (e.g., RPM packages may be converted into the IPKG format and vice versa). The packages may include source code, executable files, support files, shared libraries, etc. In addition, packages may include programs to execute (a program may be executed when a packages is installed or uninstalled).

At block 206, processing logic determines which of the package components installed on the root file system are not required for the operation of the embedded system. In one embodiment, processing logic uses the configuration parameters to identify source code packages, executable file packages and support file packages that include components which are not required for the operation of the embedded system 100. For example, the language parameter may be used to identify unneeded locales (e.g., unneeded Chinese, French, German, etc. locales for the language parameter set to English), the parameters specifying the type and functions of the embedded system may be used to identify unneeded manual pages (e.g., an appliance type requiring no manual pages), and unneeded device drivers (e.g., a set-top box requiring no display drivers), etc.

In one embodiment, processing logic also identifies unneeded shared libraries by finding shared libraries that are not referenced by any executable files on the root file system. One embodiment of a method for identifying unneeded shared libraries will be discussed in more detail below in conjunction with FIG. 3.

At block 208, processing logic removes the package components identified at block 206 from the root file system. In one embodiment, prior to removing the package components, processing logic consults the knowledge database as will be discussed in more detail below in conjunction with FIG. 4. In another embodiment, the knowledge database may also (or instead) identify package components that are not required for specific types and/or properties of embedded systems, and processing logic uses the knowledge database for the determination performed at block 206.

In one embodiment, method 200 is performed automatically, without user interaction.

In one embodiment, the memory footprint may be further reduced when testing the operation of the root file system trimmed as discussed above. One embodiment of a method for additionally reducing the root file system during testing will be discussed in more detail below in conjunction with FIG. 4B.

Figure 3:
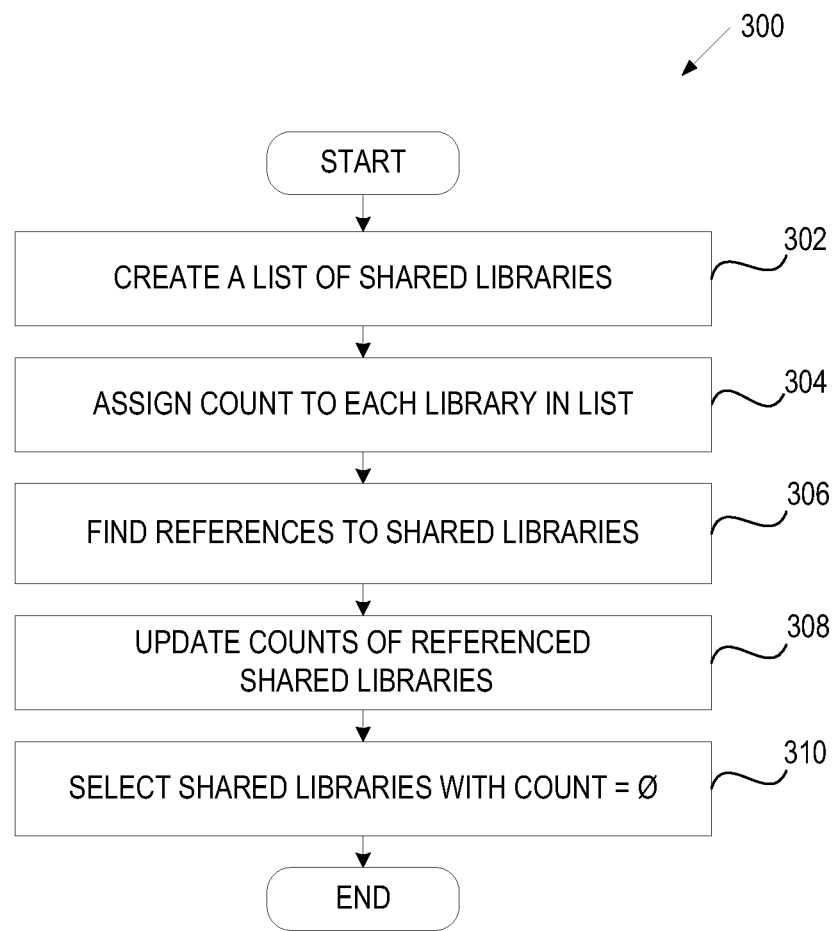
FIG. 3 is a flow diagram of one embodiment of a method for identifying shared libraries that are not required for the operation of an embedded system.

FIG. 3 is a flow diagram of one embodiment of a method 300 for identifying shared libraries that are not required for the operation of an embedded system. The method may be performed by processing logic that may comprise hardware (e.g., circuitry, dedicated logic, programmable logic, microcode, etc.), software (such as instructions run on a processing device), or a combination thereof. In one embodiment, method 300 is performed by a footprint reduction module 102 of FIG. 1.

Referring to FIG. 3, method 300 begins with processing logic analyzing the shared libraries installed on the root file system to create a list of existing shared libraries (block 302). At block 304, processing logic assigns a count equal to zero to each shared library in the list.

At block 306, processing logic finds references to shared libraries by the executable files on the root file system. In one embodiment, processing logic uses a dlopen operation to identify dependencies between executable files and shared libraries. Each time a reference to a shared library is found, processing logic increments a corresponding count by 1 (block 308).

After the shared library dependency analysis is completed, processing logic selects the shared libraries whose count is equal to zero (block 310) and decides that the selected libraries are not required for the operation of the embedded system.

Figure 4A:
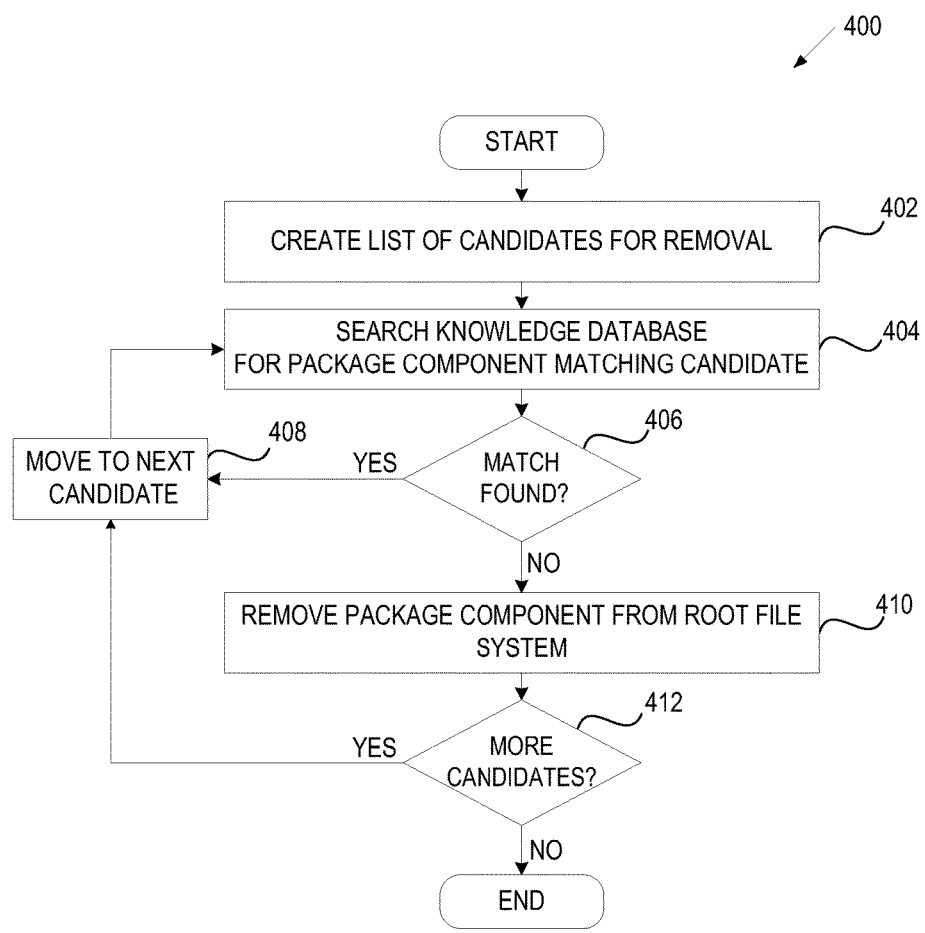
FIG. 4A is a flow diagram of one embodiment of a method for removing package components from the root file system of an embedded system using a knowledge database.

FIG. 4A is a flow diagram of one embodiment of a method 400 for removing package components from the root file system of an embedded system using a knowledge database. The method may be performed by processing logic that may comprise hardware (e.g., circuitry, dedicated logic, programmable logic, microcode, etc.), software (such as instructions run on a processing device), or a combination thereof. In one embodiment, method 400 is performed by a footprint reduction module 102 of FIG. 1.

Referring to FIG. 4A, method 400 begins with processing logic creating a list of candidates for removal based on package components identified at block 206 of FIG. 2. Then, processing logic selects the first candidate in the list and searches the knowledge database for a package component matching the candidate (block 404). The knowledge database specifies the package components that must be present on the root file system to ensure proper operation of the embedded system. The information stored in the knowledge database may be collected based on operation of various embedded systems (e.g., when an embedded system operates abnormally due to the preceding removal of a specific package component from the root file system). The information stored in the knowledge database may be common for embedded systems of the same type or embedded systems of different types.

If processing logic finds a matching package component in the knowledge database (block 406), processing logic moves to the next candidate in the candidate list (block 408) and returns to block 404. Otherwise, if processing logic does not find a matching package component in the knowledge database, processing logic removes the candidate package component from the root file system (block 410). Further, processing logic determines whether there are any other candidates in the candidate list (block 412). If not, method 400 ends. If so, processing logic proceeds to block 408.

Figure 4B:
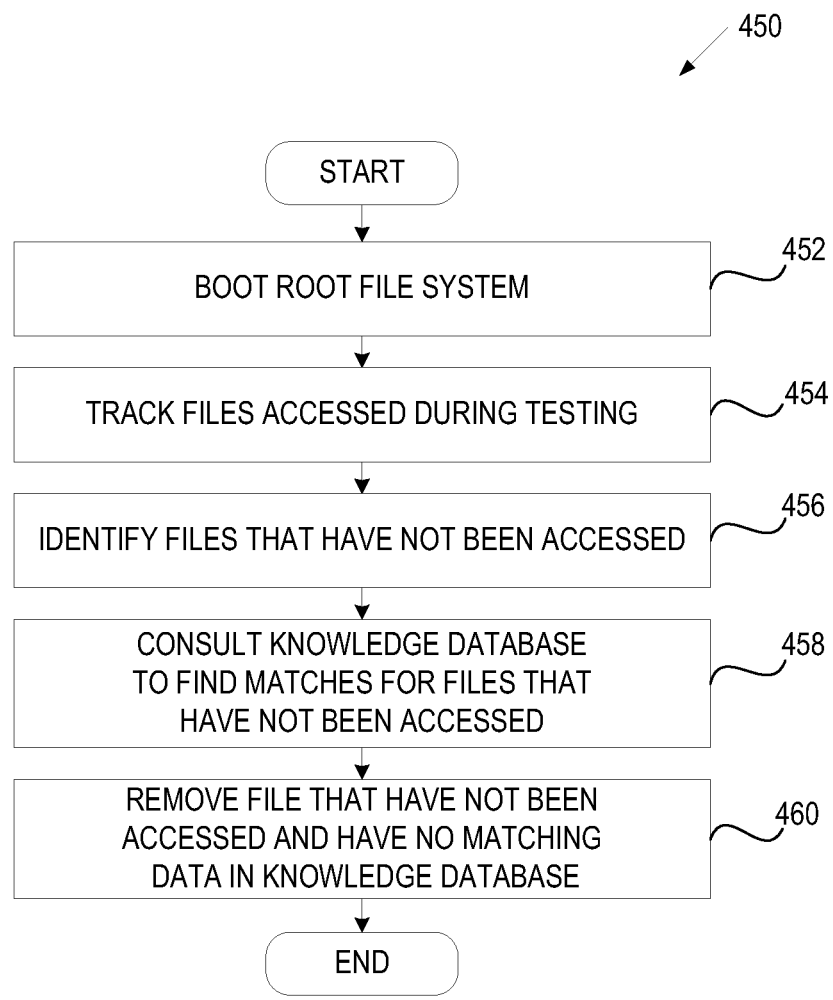
FIG. 4B is a flow diagram of one embodiment of a method for additionally reducing the root file system during testing.

FIG. 4B is a flow diagram of one embodiment of a method 450 for additionally reducing the root file system during testing. The method may be performed by processing logic that may comprise hardware (e.g., circuitry, dedicated logic, programmable logic, microcode, etc.), software (such as instructions run on a processing device), or a combination thereof. In one embodiment, method 400 is performed by a footprint reduction module 102 of FIG. 1.

Referring to FIG. 4B, method 450 begins with processing logic booting the root file system trimmed as discussed above to test its operation (block 452). At block 454, processing logic tracks which files have been accessed in the root file system during testing. In particular, in one embodiment, processing logic travels through all testable codepaths, and generates a list of files which were accessed.

At block 456, processing logic uses this list to identify the files in the root file system that were not accessed. At block 458, processing logic consults the knowledge database to determine whether the files that were not accessed have matching data in the knowledge database. At block 460, processing logic removes the files that were not accessed and also have no matching data in the knowledge data base from the root file system.

Figure 5:
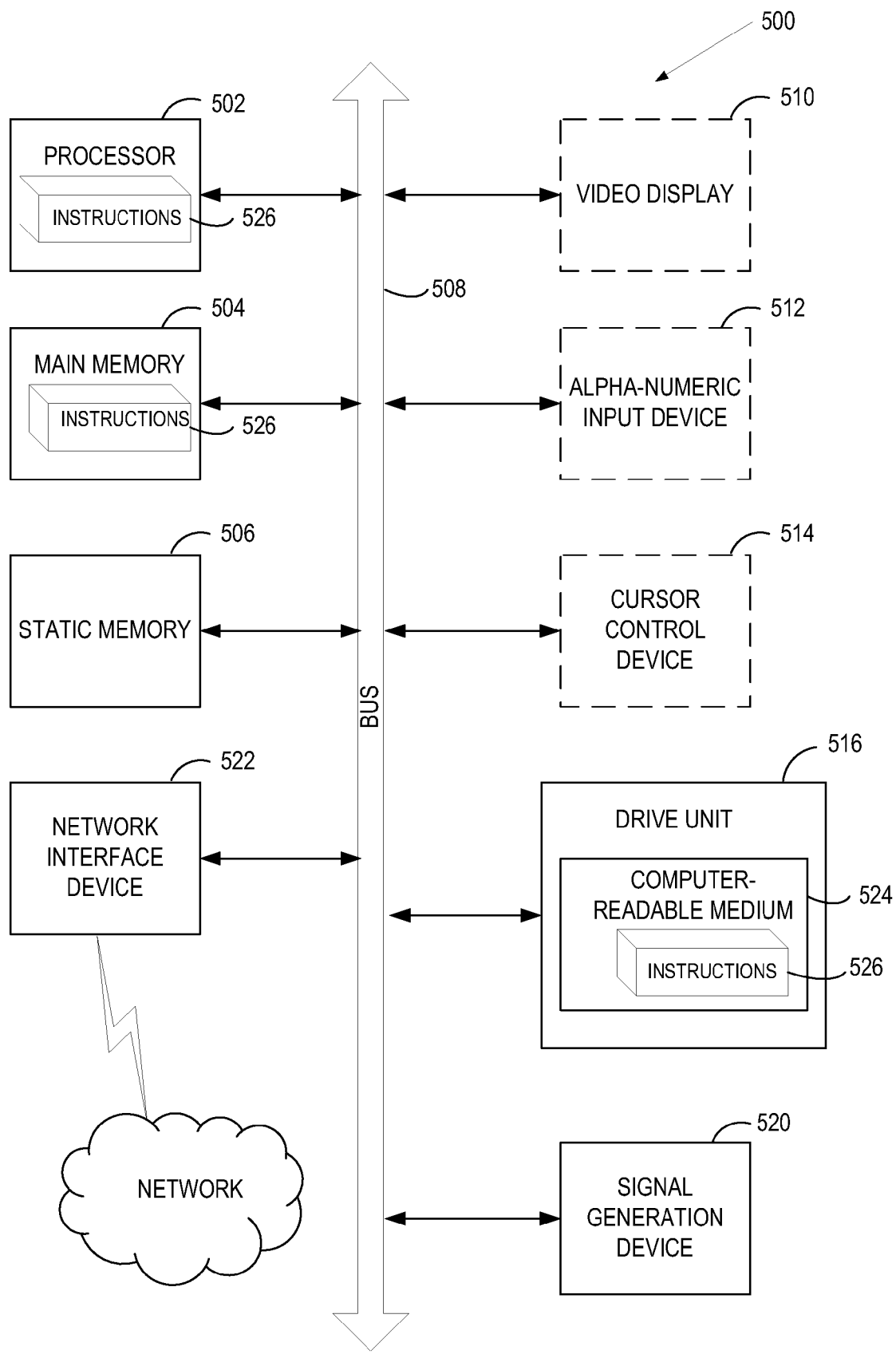
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be an appliance, a smart phone, a PDA, or other similar device with an embedded system such as an embedded system 100 of FIG. 1.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 522. Depending on the type of the computer system 500, it also may include a video display unit 510 (e.g., a liquid crystal display (LCD) or a cathode ray tube (CRT)), an alphanumeric input device 512 (e.g., a keyboard), a cursor control device 514 (e.g., a mouse), and/or a signal generation device 520 (e.g., a speaker). Although not shown, the computer system 500 may also include a pen digitizer and/or pen or stylus. The digitizer may be apart from the video display unit 510 or co-extensive with the display area of the display unit 510. Further, the digitizer may be integrated in the display unit 510, or may exist as a separate device overlaying or otherwise appended to the display unit 510.

The computer system 500 may also include a data storage device 516 having a machine-accessible storage medium 524 on which is stored one or more sets of instructions (e.g., software 526) embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-accessible storage media. The software 526 may further be transmitted or received over a network 520 via the network interface device 522.

While the machine-accessible storage medium 524 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:

identifying a plurality of packages installed in a root file system of an embedded system, the plurality of packages comprising source code, executable files and support files of an operating system and applications of the embedded system;

upon booting the root file system, testing an operation of the embedded system, wherein testing the operation of the embedded system comprises identifying, during the testing of the embedded system, package components in the plurality of packages that were accessed in the root file system, and package components in the plurality of packages that were not accessed in the root file system;

determining which of the identified package components that were not accessed during the testing of the embedded system are not needed for the operation of the embedded system, the identified package components comprising source code, executable files and support files that are not needed for the operation of the embedded system, wherein determining which of the identified package components that were not accessed during the testing of the embedded system are not needed for the operation of the embedded system comprises consulting a knowledge database, which comprises a listing of package components that are needed for the operation of the embedded system, to determine which of the identified package components that were not accessed during the testing of the embedded system have no matching data in the listing within the knowledge data base; and reducing, by a processing device, a memory footprint of the embedded system by removing the package components that were identified as not accessed during the testing and not having matching data in the listing within the knowledge data base.

2. The method of claim 1 further comprising:

identifying configuration parameters of the embedded system; and utilizing the configuration parameters to determine which package components are not needed.

3. The method of claim 2 wherein the configuration parameters identify at least one of a type of the embedded system or a language to be used by a user.

4. The method of claim 1 wherein the identifying, the determining and the reducing are performed without user interaction.

5. The method of claim 1 wherein the package components that are not needed comprise one or more of unneeded manual pages, unneeded locales, or unneeded device drivers.

6. The method of claim 1 wherein determining which of the identified package components are not needed comprises:

identifying shared libraries that are not referenced by executable files within the root file system.

7. The method of claim 6 wherein identifying shared libraries that are not referenced comprises:

creating a shared library list including every shared library in the root file system;

assigning a count to each shared library in the list;

for each executable file in the root file system, finding references to shared libraries, and updating counts of referenced shared libraries; and selecting shared libraries having a count equal to zero.

8. The method of claim 1 further comprising: updating the knowledge database upon determining that removal of a package component from the root file system has caused abnormal operation of the embedded system.

9. The method of claim 1 wherein the plurality of packages are in an RPM format.

10. A non-transitory computer-readable medium including instructions that, when accessed by a processing device, cause the processing device to perform a method comprising:

identifying a plurality of packages installed in a root the system of an embedded system, the plurality of packages comprising source code, executable and support files of an operating system and applications of the embedded system;

upon booting the root the system, testing an operation of the embedded system, wherein testing the operation of the embedded system comprises identifying, during the testing of the embedded system, package components in the plurality of packages that were accessed in the root the system, and package components in the plurality of packages that were not accessed in the root the system;

determining which of the identified package components that were not accessed during the testing of the embedded system are not needed for the operation of the embedded system, the identified package components comprising source code, executable files and support files that are not needed for the operation of the embedded system, wherein determining which of the identified package components that were not accessed during the testing of the embedded system are not needed for the operation of the embedded system comprises consulting a knowledge database, which comprises a listing of package components that are needed for the operation of the embedded system, to determine which of the identified package components that were not accessed during the testing of the embedded system have no matching data in the listing within knowledge data base; and reducing, by the processing device, a memory footprint of the embedded system by removing the package components that were identified as not accessed during the testing and not having matching data in the listing within the knowledge data base.

11. The computer-readable medium of claim 10 wherein the method further comprises:

identifying configuration parameters of the embedded system; and utilizing the configuration parameters to determine which package components are not needed.

12. The computer-readable medium of claim 10 wherein the package components that are not needed comprise one or more of unneeded manual pages, unneeded locales, or unneeded device drivers.

13. The computer-readable medium of claim 10 wherein determining which of the identified package components are not needed comprises:

identifying shared libraries that are not referenced by executable files within the root file system.

14. An embedded system comprising:

a processor;

a root the system, coupled to the processor, the root the system having a plurality of packages installed therein, the plurality of packages comprising source code, executable files and support files of an operating system and applications of the embedded system, wherein the processor is to:

test, upon booting the root the system, an operation of the embedded system to reduce a memory footprint of the embedded system, to identify, during the testing of the embedded system, package components in the plurality of packages that were accessed in the root file system, and package components in the plurality of packages that were not accessed in the root file system;

determine which of the identified package components that were not accessed during the testing of the embedded system are not needed for the operation of the embedded system, the identified package components comprising source code, executable files and support files that are not needed for the operation of the embedded system, wherein determining which of the identified package components that were not accessed during the testing of the embedded system are not needed for the operation of the embedded system comprises consulting a knowledge database, which comprises a listing of package components that are needed for the operation of the embedded system, to determine which of the identified package components that were not accessed during the testing of the embedded system have no matching data in the listing within the knowledge data base; and reduce a memory footprint of the embedded system by removing the package components that were identified as not accessed during the testing and not having matching data in the listing within the knowledge data base.

15. The system of claim 14 wherein the processor is further to identify configuration parameters of the embedded system, and to utilize the configuration parameters to determine which package components are not needed.

16. The system of claim 14 wherein the processor is to determine which package components are not needed by identifying shared libraries that are not referenced by executable files within the root file system.

* * * * *